(12) United States Patent
Palavalli et al.

(10) Patent No.: US 12,107,722 B2
(45) Date of Patent: Oct. 1, 2024

(54) SHARING NETWORK MANAGER BETWEEN MULTIPLE TENANTS

(71) Applicant: VMware LLC, Palo Alto, CA (US)

(72) Inventors: Amarnath Palavalli, Cupertino, CA (US); Suresh Muppala, Cupertino, CA (US); Farzad Ghannadian, Burlingame, CA (US); Sukhdev Singh, San Jose, CA (US); Pavlush Margarian, Dublin, CA (US)

(73) Assignee: VMware LLC, Palo Alto, CA (US)

( * ) Notice: Subject to any disclaimer, the term of this patent is extended or adjusted under 35 U.S.C. 154(b) by 0 days.

(21) Appl. No.: 17/869,637

(22) Filed: Jul. 20, 2022

(65) Prior Publication Data

US 2024/0031225 A1  Jan. 25, 2024

(51) Int. Cl.
*G06F 15/177* (2006.01)
*H04L 41/0816* (2022.01)
(Continued)

(52) U.S. Cl.
CPC ...... *H04L 41/0816* (2013.01); *H04L 41/0894* (2022.05); *H04L 47/125* (2013.01); *H04L 47/827* (2013.01); *H04L 49/90* (2013.01)

(58) Field of Classification Search
CPC ............. H04L 41/0816; H04L 41/0894; H04L 47/125; H04L 47/827; H04L 49/90
(Continued)

(56) References Cited

U.S. PATENT DOCUMENTS 5,842,043 A    11/1998  Nishimura
6,219,699 B1    4/2001  McCloghrie et al.
(Continued)

FOREIGN PATENT DOCUMENTS

CA    3119423 A1    3/2018
CN  102124456 A    7/2011
(Continued)

OTHER PUBLICATIONS

Non-Published Commonly Owned U.S. Appl. No. 18/227,655 (G568.C2), filed Jul. 28, 2023, 133 pages, VMware, Inc.
(Continued)

*Primary Examiner* — Imad Hussain
(74) *Attorney, Agent, or Firm* — Quarles & Brady LLP

(57) ABSTRACT

Some embodiments provide a method for one of multiple shared API processing services in a container cluster that implements a network policy manager shared between multiple tenants. The method receives a configuration request from a particular tenant to modify a logical network configuration for the particular tenant. Configuration requests from the plurality of tenants are balanced across the plurality of shared API processing services. Based on the received configuration request, the method posts a logical network configuration change to a configuration queue in the cluster. The configuration queue is dedicated to the logical network of the particular tenant. Services are instantiated separately in the container cluster for each tenant to distribute configuration changes from the respective configuration queues for the tenants to datacenters that implement the tenant logical networks such that configuration changes for one tenant do not slow down processing of configuration changes for other tenants.

19 Claims, 9 Drawing Sheets

(51) Int. Cl.
  *H04L 41/0894* (2022.01)
  *H04L 47/125* (2022.01)
  *H04L 47/70* (2022.01)
  *H04L 49/90* (2022.01)

(58) Field of Classification Search
  USPC ........................................................ 709/221
  See application file for complete search history.

(56) References Cited

U.S. PATENT DOCUMENTS

| | | |
|---|---|---|
| 6,347,374 B1 | 2/2002 | Drake et al. |
| 6,615,230 B2 | 9/2003 | Nishimura |
| 7,502,884 B1 | 3/2009 | Shah et al. |
| 7,539,745 B1 | 5/2009 | Wang et al. |
| 7,802,000 B1 | 9/2010 | Huang et al. |
| 7,965,699 B1 | 6/2011 | Accardi et al. |
| 8,479,275 B1 | 7/2013 | Naseh |
| 8,611,351 B2 | 12/2013 | Gooch et al. |
| 8,625,616 B2 | 1/2014 | Vobbilisetty et al. |
| 8,660,129 B1 | 2/2014 | Brendel et al. |
| 8,707,417 B1 | 4/2014 | Liang et al. |
| 9,069,599 B2 | 6/2015 | Martinez et al. |
| 9,215,213 B2 | 12/2015 | Bansal et al. |
| 9,294,270 B2 | 3/2016 | Wainner et al. |
| 9,311,122 B2 | 4/2016 | Guay et al. |
| 9,330,161 B2 | 5/2016 | D'Amato et al. |
| 9,432,215 B2 | 8/2016 | Stabile et al. |
| 9,602,312 B2 | 3/2017 | Koponen et al. |
| 9,672,054 B1 | 6/2017 | Gupta et al. |
| 9,672,060 B2 | 6/2017 | Behere et al. |
| 9,755,965 B1 | 9/2017 | Yadav et al. |
| 9,825,851 B2 | 11/2017 | Agarwal et al. |
| 9,847,938 B2 | 12/2017 | Chanda et al. |
| 9,876,711 B2 | 1/2018 | Chu et al. |
| 9,906,560 B2 | 2/2018 | Jain et al. |
| 9,912,616 B2 | 3/2018 | Shen et al. |
| 9,923,811 B2 | 3/2018 | Agarwal et al. |
| 9,977,688 B2 | 5/2018 | Nipane et al. |
| 10,091,028 B2 | 10/2018 | Koponen et al. |
| 10,110,417 B1 | 10/2018 | Hankins et al. |
| 10,120,668 B2 | 11/2018 | Palavalli et al. |
| 10,129,142 B2 | 11/2018 | Goliya et al. |
| 10,135,675 B2 | 11/2018 | Yu et al. |
| 10,142,127 B2 | 11/2018 | Cherian et al. |
| 10,162,656 B2 | 12/2018 | Palavalli et al. |
| 10,187,302 B2 | 1/2019 | Chu et al. |
| 10,205,771 B2 | 2/2019 | Palavalli et al. |
| 10,241,820 B2 | 3/2019 | Lambeth et al. |
| 10,243,797 B2 | 3/2019 | Lambeth et al. |
| 10,243,834 B1 | 3/2019 | Shekhar et al. |
| 10,243,846 B2 | 3/2019 | Jiang et al. |
| 10,243,848 B2 | 3/2019 | Agarwal et al. |
| 10,257,049 B2 | 4/2019 | Fried et al. |
| 10,298,489 B2 | 5/2019 | Williams et al. |
| 10,333,959 B2 | 6/2019 | Katrekar et al. |
| 10,339,123 B2 | 7/2019 | Venkatesh et al. |
| 10,382,529 B2 | 8/2019 | Wan et al. |
| 10,412,018 B1 | 9/2019 | Feng et al. |
| 10,560,343 B1 | 2/2020 | Cartsonis et al. |
| 10,579,945 B2 | 3/2020 | Gaurav et al. |
| 10,587,479 B2 | 3/2020 | Shakimov et al. |
| 10,601,705 B2 | 3/2020 | Hira et al. |
| 10,616,279 B2 | 4/2020 | Nimmagadda et al. |
| 10,637,800 B2 | 4/2020 | Wang et al. |
| 10,673,752 B2 | 6/2020 | Agarwal et al. |
| 10,693,833 B2 | 6/2020 | Mathew et al. |
| 10,832,224 B2 | 11/2020 | Palavalli et al. |
| 10,862,753 B2 | 12/2020 | Hira et al. |
| 10,880,158 B2 | 12/2020 | Lambeth et al. |
| 10,880,170 B2 | 12/2020 | Wang et al. |
| 10,897,420 B1 | 1/2021 | Pianigiani et al. |
| 10,908,938 B2 | 2/2021 | Palavalli et al. |
| 10,942,788 B2 | 3/2021 | Palavalli et al. |
| 10,999,154 B1 | 5/2021 | Ahrenholz et al. |
| 11,057,275 B1 | 7/2021 | Arunachalam et al. |
| 11,088,902 B1 | 8/2021 | Palavalli et al. |
| 11,088,916 B1 | 8/2021 | Chandrashekhar et al. |
| 11,088,919 B1 | 8/2021 | Chandrashekhar et al. |
| 11,115,301 B1 | 9/2021 | Margarian et al. |
| 11,133,958 B2 | 9/2021 | Torvi et al. |
| 11,153,170 B1 | 10/2021 | Chandrashekhar et al. |
| 11,182,163 B1 | 11/2021 | Beals et al. |
| 11,258,668 B2 | 2/2022 | Chandrashekhar et al. |
| 11,303,557 B2 | 4/2022 | Chandrashekhar et al. |
| 11,316,773 B2 | 4/2022 | Dubey et al. |
| 11,336,486 B2 | 5/2022 | Sharma et al. |
| 11,336,556 B2 | 5/2022 | Chandrashekhar et al. |
| 11,343,227 B2 | 5/2022 | Vaidya et al. |
| 11,343,283 B2 | 5/2022 | Vaidya et al. |
| 11,374,817 B2 | 6/2022 | Chandrashekhar et al. |
| 11,374,850 B2 | 6/2022 | Chandrashekhar et al. |
| 11,381,456 B2 | 7/2022 | Manzanilla et al. |
| 11,394,634 B2 | 7/2022 | Chandrashekhar et al. |
| 11,438,238 B2 | 9/2022 | Chandrashekhar et al. |
| 11,496,392 B2 | 11/2022 | Agarwal et al. |
| 11,509,522 B2 | 11/2022 | Palavalli et al. |
| 11,528,214 B2 | 12/2022 | Chandrashekar et al. |
| 11,601,474 B2 | 3/2023 | Vaidya et al. |
| 11,683,233 B2 | 6/2023 | Rogozinsky et al. |
| 11,736,383 B2 | 8/2023 | Chandrashekhar et al. |
| 11,743,168 B2 | 8/2023 | Dubey et al. |
| 11,843,548 B1 * | 12/2023 | Devendranath ....... H04L 47/822 |
| 2002/0029270 A1 | 3/2002 | Szczepanek |
| 2002/0093952 A1 | 7/2002 | Gonda |
| 2002/0131414 A1 | 9/2002 | Hadzic |
| 2003/0046347 A1 | 3/2003 | Nishimura |
| 2003/0167333 A1 | 9/2003 | Kumar et al. |
| 2003/0185151 A1 | 10/2003 | Kurosawa et al. |
| 2003/0185152 A1 | 10/2003 | Nederveen et al. |
| 2003/0188114 A1 | 10/2003 | Lubbers et al. |
| 2003/0188218 A1 | 10/2003 | Lubbers et al. |
| 2004/0052257 A1 | 3/2004 | Abdo et al. |
| 2005/0190757 A1 | 9/2005 | Sajassi |
| 2005/0235352 A1 | 10/2005 | Staats et al. |
| 2005/0288040 A1 | 12/2005 | Charpentier et al. |
| 2006/0092976 A1 | 5/2006 | Lakshman et al. |
| 2006/0179243 A1 | 8/2006 | Fields et al. |
| 2006/0179245 A1 | 8/2006 | Fields et al. |
| 2006/0193252 A1 | 8/2006 | Naseh et al. |
| 2006/0195896 A1 | 8/2006 | Fulp et al. |
| 2006/0221720 A1 | 10/2006 | Reuter |
| 2006/0251120 A1 | 11/2006 | Arimilli et al. |
| 2006/0287842 A1 | 12/2006 | Kim |
| 2007/0058631 A1 | 3/2007 | Mortier et al. |
| 2007/0130295 A1 | 6/2007 | Rastogi et al. |
| 2007/0217419 A1 | 9/2007 | Vasseur |
| 2007/0219653 A1 | 9/2007 | Martin |
| 2007/0239987 A1 | 10/2007 | Hoole et al. |
| 2008/0013474 A1 | 1/2008 | Nagarajan et al. |
| 2008/0049646 A1 | 2/2008 | Lu |
| 2008/0104302 A1 | 5/2008 | Carpio |
| 2008/0133729 A1 | 6/2008 | Fridman et al. |
| 2008/0268847 A1 | 10/2008 | Mukherjee et al. |
| 2008/0301379 A1 | 12/2008 | Pong |
| 2009/0037367 A1 | 2/2009 | Wein |
| 2009/0070337 A1 | 3/2009 | Romem et al. |
| 2009/0193297 A1 | 7/2009 | Williams et al. |
| 2009/0241192 A1 | 9/2009 | Thomas |
| 2009/0279536 A1 | 11/2009 | Unbehagen et al. |
| 2009/0279545 A1 | 11/2009 | Moonen |
| 2009/0292858 A1 | 11/2009 | Lambeth et al. |
| 2009/0296726 A1 | 12/2009 | Snively et al. |
| 2010/0250784 A1 | 9/2010 | Henry et al. |
| 2010/0257263 A1 | 10/2010 | Casado et al. |
| 2010/0275199 A1 | 10/2010 | Smith et al. |
| 2010/0322255 A1 | 12/2010 | Hao et al. |
| 2011/0032898 A1 | 2/2011 | Kazmi et al. |
| 2011/0047218 A1 | 2/2011 | Nojima et al. |
| 2011/0051714 A1 | 3/2011 | Somes |
| 2011/0085569 A1 | 4/2011 | Gnanasekaran et al. |
| 2011/0164752 A1 | 7/2011 | Wainner et al. |
| 2011/0188509 A1 | 8/2011 | Kern et al. |
| 2011/0231602 A1 | 9/2011 | Woods et al. |

(56) References Cited

U.S. PATENT DOCUMENTS

| | | |
|---|---|---|
| 2011/0299413 A1 | 12/2011 | Chatwani et al. |
| 2012/0084406 A1 | 4/2012 | Kumbalimutt |
| 2012/0120964 A1 | 5/2012 | Koponen et al. |
| 2012/0147898 A1 | 6/2012 | Koponen et al. |
| 2012/0275328 A1 | 11/2012 | Iwata et al. |
| 2013/0018947 A1 | 1/2013 | Archer et al. |
| 2013/0024579 A1 | 1/2013 | Zhang et al. |
| 2013/0042242 A1 | 2/2013 | Kagan |
| 2013/0044636 A1 | 2/2013 | Koponen et al. |
| 2013/0044641 A1 | 2/2013 | Koponen et al. |
| 2013/0044761 A1 | 2/2013 | Koponen et al. |
| 2013/0058250 A1 | 3/2013 | Casado et al. |
| 2013/0058335 A1 | 3/2013 | Koponen et al. |
| 2013/0058350 A1 | 3/2013 | Fulton |
| 2013/0058354 A1 | 3/2013 | Casado et al. |
| 2013/0058358 A1 | 3/2013 | Fulton et al. |
| 2013/0060819 A1 | 3/2013 | Lambeth et al. |
| 2013/0060940 A1 | 3/2013 | Koponen et al. |
| 2013/0074065 A1 | 3/2013 | McNeeney et al. |
| 2013/0103817 A1 | 4/2013 | Koponen et al. |
| 2013/0125120 A1 | 5/2013 | Zhang et al. |
| 2013/0132533 A1 | 5/2013 | Padmanabhan et al. |
| 2013/0144992 A1 | 6/2013 | Barabash et al. |
| 2013/0159637 A1 | 6/2013 | Forgette et al. |
| 2013/0212212 A1 | 8/2013 | Addepalli et al. |
| 2013/0215769 A1 | 8/2013 | Beheshti-Zavareh et al. |
| 2013/0254328 A1 | 9/2013 | Inoue et al. |
| 2013/0286833 A1 | 10/2013 | Torres et al. |
| 2013/0287026 A1 | 10/2013 | Davie |
| 2013/0301425 A1 | 11/2013 | Udutha et al. |
| 2013/0301501 A1 | 11/2013 | Olvera-Hernandez et al. |
| 2013/0301646 A1 | 11/2013 | Bogdanski et al. |
| 2013/0308641 A1 | 11/2013 | Ackley |
| 2014/0006354 A1 | 1/2014 | Parkison et al. |
| 2014/0006357 A1 | 1/2014 | Davis et al. |
| 2014/0006465 A1 | 1/2014 | Davis et al. |
| 2014/0007239 A1 | 1/2014 | Sharpe et al. |
| 2014/0064104 A1 | 3/2014 | Nataraja et al. |
| 2014/0075002 A1 | 3/2014 | Pradhan et al. |
| 2014/0136908 A1 | 5/2014 | Maggiari et al. |
| 2014/0146817 A1 | 5/2014 | Zhang |
| 2014/0169365 A1 | 6/2014 | Sundaram et al. |
| 2014/0172740 A1 | 6/2014 | McCormick et al. |
| 2014/0172939 A1 | 6/2014 | McSherry et al. |
| 2014/0201218 A1 | 7/2014 | Catalano et al. |
| 2014/0208150 A1 | 7/2014 | Abuelsaad et al. |
| 2014/0211661 A1 | 7/2014 | Gorkemli et al. |
| 2014/0241356 A1 | 8/2014 | Zhang et al. |
| 2014/0250220 A1 | 9/2014 | Kapadia et al. |
| 2014/0269435 A1 | 9/2014 | McConnell et al. |
| 2014/0301391 A1 | 10/2014 | Krishnan et al. |
| 2014/0304355 A1 | 10/2014 | Kamath et al. |
| 2014/0307744 A1 | 10/2014 | Dunbar et al. |
| 2014/0337500 A1 | 11/2014 | Lee |
| 2014/0351396 A1 | 11/2014 | Stabile et al. |
| 2015/0009797 A1 | 1/2015 | Koponen et al. |
| 2015/0009808 A1 | 1/2015 | Bejerano et al. |
| 2015/0010012 A1 | 1/2015 | Koponen et al. |
| 2015/0016276 A1 | 1/2015 | Decusatis et al. |
| 2015/0063364 A1 | 3/2015 | Thakkar et al. |
| 2015/0085862 A1 | 3/2015 | Song |
| 2015/0100704 A1 | 4/2015 | Davie et al. |
| 2015/0103842 A1 | 4/2015 | Chandrashekhar et al. |
| 2015/0103843 A1 | 4/2015 | Chandrashekhar et al. |
| 2015/0106804 A1 | 4/2015 | Chandrashekhar et al. |
| 2015/0117216 A1 | 4/2015 | Anand et al. |
| 2015/0117256 A1 | 4/2015 | Sabaa et al. |
| 2015/0154330 A1 | 6/2015 | Yachide et al. |
| 2015/0195126 A1 | 7/2015 | Vasseur et al. |
| 2015/0229641 A1 | 8/2015 | Sun et al. |
| 2015/0234668 A1 | 8/2015 | Ravinoothala et al. |
| 2015/0237014 A1 | 8/2015 | Bansal et al. |
| 2015/0263946 A1 | 9/2015 | Tubaltsev et al. |
| 2015/0264135 A1 | 9/2015 | Kandula et al. |
| 2015/0312274 A1 | 10/2015 | Bishop et al. |
| 2015/0312326 A1 | 10/2015 | Archer et al. |
| 2015/0326467 A1 | 11/2015 | Fullbright et al. |
| 2015/0381494 A1 | 12/2015 | Cherian et al. |
| 2016/0057014 A1 | 2/2016 | Thakkar et al. |
| 2016/0094396 A1 | 3/2016 | Chandrashekhar et al. |
| 2016/0094661 A1 | 3/2016 | Jain et al. |
| 2016/0134528 A1 | 5/2016 | Lin et al. |
| 2016/0173338 A1 | 6/2016 | Wolting |
| 2016/0191374 A1 | 6/2016 | Singh et al. |
| 2016/0210209 A1 | 7/2016 | Verkaik et al. |
| 2016/0226700 A1 | 8/2016 | Zhang et al. |
| 2016/0226762 A1 | 8/2016 | Zhang et al. |
| 2016/0226822 A1 | 8/2016 | Zhang et al. |
| 2016/0226959 A1 | 8/2016 | Zhang et al. |
| 2016/0226967 A1 | 8/2016 | Zhang et al. |
| 2016/0277289 A1 | 9/2016 | Madabushi et al. |
| 2016/0352588 A1 | 12/2016 | Subbarayan et al. |
| 2016/0359705 A1 | 12/2016 | Parandehgheibi et al. |
| 2016/0373530 A1 | 12/2016 | Duda |
| 2016/0380815 A1 | 12/2016 | Agarwal et al. |
| 2016/0380891 A1 | 12/2016 | Agarwal et al. |
| 2016/0380925 A1 | 12/2016 | Agarwal et al. |
| 2016/0380973 A1 | 12/2016 | Sullenberger et al. |
| 2017/0005988 A1 | 1/2017 | Bansal et al. |
| 2017/0034052 A1 | 2/2017 | Chanda et al. |
| 2017/0034129 A1 | 2/2017 | Sawant et al. |
| 2017/0041347 A1 | 2/2017 | Nagaratnam et al. |
| 2017/0048110 A1 | 2/2017 | Wu et al. |
| 2017/0048130 A1 | 2/2017 | Goliya et al. |
| 2017/0063633 A1 | 3/2017 | Goliya et al. |
| 2017/0063794 A1 | 3/2017 | Jain et al. |
| 2017/0063822 A1 | 3/2017 | Jain et al. |
| 2017/0093617 A1 | 3/2017 | Chanda et al. |
| 2017/0093636 A1 | 3/2017 | Chanda et al. |
| 2017/0104720 A1 | 4/2017 | Bansal et al. |
| 2017/0126431 A1 | 5/2017 | Han et al. |
| 2017/0126497 A1 | 5/2017 | Dubey et al. |
| 2017/0126551 A1 | 5/2017 | Pfaff et al. |
| 2017/0163442 A1 | 6/2017 | Shen et al. |
| 2017/0163532 A1 | 6/2017 | Tubaltsev et al. |
| 2017/0163598 A1 | 6/2017 | Shen et al. |
| 2017/0163599 A1 | 6/2017 | Shen et al. |
| 2017/0171055 A1 | 6/2017 | Wang et al. |
| 2017/0222873 A1 | 8/2017 | Lee et al. |
| 2017/0249195 A1 | 8/2017 | Sadana et al. |
| 2017/0250912 A1 | 8/2017 | Chu et al. |
| 2017/0264483 A1 | 9/2017 | Lambeth et al. |
| 2017/0288981 A1 | 10/2017 | Hong et al. |
| 2017/0289033 A1 | 10/2017 | Singh et al. |
| 2017/0302531 A1 | 10/2017 | Maes |
| 2017/0310641 A1 | 10/2017 | Jiang et al. |
| 2017/0317954 A1 | 11/2017 | Masurekar et al. |
| 2017/0317969 A1 | 11/2017 | Masurekar et al. |
| 2017/0317971 A1 | 11/2017 | Dubey et al. |
| 2017/0318113 A1 | 11/2017 | Ganichev et al. |
| 2017/0324645 A1 | 11/2017 | Johnsen et al. |
| 2017/0331711 A1 | 11/2017 | Duda |
| 2017/0344444 A1 | 11/2017 | Costa-Roberts et al. |
| 2018/0007004 A1 | 1/2018 | Basler |
| 2018/0062880 A1 | 3/2018 | Yu et al. |
| 2018/0062881 A1 | 3/2018 | Chandrashekhar et al. |
| 2018/0062923 A1 | 3/2018 | Katrekar et al. |
| 2018/0062944 A1 | 3/2018 | Altman et al. |
| 2018/0063036 A1 | 3/2018 | Chandrashekhar et al. |
| 2018/0063195 A1 | 3/2018 | Nimmagadda et al. |
| 2018/0083835 A1 | 3/2018 | Cole et al. |
| 2018/0123877 A1 | 5/2018 | Saxena et al. |
| 2018/0123903 A1 | 5/2018 | Holla et al. |
| 2018/0157537 A1 | 6/2018 | Chen et al. |
| 2018/0191682 A1 | 7/2018 | Liu et al. |
| 2018/0234337 A1 | 8/2018 | Goliya et al. |
| 2018/0234459 A1 | 8/2018 | Kung et al. |
| 2018/0309718 A1 | 10/2018 | Zuo |
| 2018/0373961 A1 | 12/2018 | Wang et al. |
| 2019/0014040 A1 | 1/2019 | Yerrapureddy et al. |
| 2019/0069335 A1 | 2/2019 | Wu |
| 2019/0109669 A1 | 4/2019 | Zachman et al. |
| 2019/0158537 A1 | 5/2019 | Miriyala |
| 2019/0190780 A1 | 6/2019 | Wang et al. |

(56) References Cited

U.S. PATENT DOCUMENTS

| | | |
|---|---|---|
| 2019/0207847 A1 | 7/2019 | Agarwal et al. |
| 2019/0245888 A1 | 8/2019 | Martinez et al. |
| 2019/0260610 A1 | 8/2019 | Dubey et al. |
| 2019/0260630 A1 | 8/2019 | Stabile et al. |
| 2019/0297114 A1 | 9/2019 | Panchalingam et al. |
| 2019/0303326 A1 | 10/2019 | Desai et al. |
| 2019/0334765 A1 | 10/2019 | Jain et al. |
| 2019/0342175 A1 | 11/2019 | Wan et al. |
| 2019/0363975 A1 | 11/2019 | Djernaes |
| 2019/0379731 A1 | 12/2019 | Johnsen et al. |
| 2020/0007392 A1 | 1/2020 | Goyal |
| 2020/0007582 A1 | 1/2020 | Dixit et al. |
| 2020/0007584 A1 | 1/2020 | Dixit et al. |
| 2020/0014662 A1 | 1/2020 | Chanda et al. |
| 2020/0021541 A1 | 1/2020 | Chanda |
| 2020/0057669 A1 | 2/2020 | Hutcheson et al. |
| 2020/0076684 A1 | 3/2020 | Naveen et al. |
| 2020/0106744 A1 | 4/2020 | Miriyala et al. |
| 2020/0162325 A1 | 5/2020 | Desai et al. |
| 2020/0162337 A1 | 5/2020 | Jain et al. |
| 2020/0169496 A1 | 5/2020 | Goliya et al. |
| 2020/0169516 A1 | 5/2020 | Patel et al. |
| 2020/0195607 A1 | 6/2020 | Wang et al. |
| 2020/0257549 A1 | 8/2020 | Vlaznev et al. |
| 2020/0296035 A1 | 9/2020 | Agarwal et al. |
| 2020/0304427 A1 | 9/2020 | Sandler et al. |
| 2020/0358693 A1 | 11/2020 | Rawlins |
| 2020/0366741 A1 | 11/2020 | Kancherla et al. |
| 2020/0409563 A1 | 12/2020 | Parasnis et al. |
| 2021/0036889 A1 | 2/2021 | Jain et al. |
| 2021/0067556 A1 | 3/2021 | Tahan |
| 2021/0117217 A1* | 4/2021 | Croteau ............. G06F 11/3409 |
| 2021/0117908 A1 | 4/2021 | Coles et al. |
| 2021/0126641 A1 | 4/2021 | Yan et al. |
| 2021/0168197 A1 | 6/2021 | Jones et al. |
| 2021/0194729 A1 | 6/2021 | Semwal et al. |
| 2021/0216565 A1* | 7/2021 | Petschulat ............. G06F 16/254 |
| 2021/0311764 A1* | 10/2021 | Rosoff ................ G06F 9/44505 |
| 2021/0311960 A1 | 10/2021 | Rogozinsky et al. |
| 2021/0314192 A1 | 10/2021 | Chandrashekhar et al. |
| 2021/0314193 A1 | 10/2021 | Chandrashekhar et al. |
| 2021/0314212 A1 | 10/2021 | Chandrashekhar et al. |
| 2021/0314215 A1 | 10/2021 | Manzanilla et al. |
| 2021/0314219 A1 | 10/2021 | Gujar et al. |
| 2021/0314225 A1 | 10/2021 | Chandrashekhar et al. |
| 2021/0314226 A1 | 10/2021 | Chandrashekhar et al. |
| 2021/0314227 A1 | 10/2021 | Chandrashekhar et al. |
| 2021/0314228 A1 | 10/2021 | Chandrashekhar et al. |
| 2021/0314235 A1 | 10/2021 | Chandrashekhar et al. |
| 2021/0314251 A1 | 10/2021 | Dubey et al. |
| 2021/0314256 A1 | 10/2021 | Chandrashekhar et al. |
| 2021/0314257 A1 | 10/2021 | Chandrashekhar et al. |
| 2021/0314258 A1 | 10/2021 | Chandrashekhar et al. |
| 2021/0314289 A1 | 10/2021 | Chandrashekhar et al. |
| 2021/0314291 A1 | 10/2021 | Chandrashekhar et al. |
| 2021/0367834 A1 | 11/2021 | Palavalli et al. |
| 2022/0103429 A1 | 3/2022 | Vaidya et al. |
| 2022/0103430 A1 | 3/2022 | Vaidya et al. |
| 2022/0103514 A1 | 3/2022 | Vaidya et al. |
| 2022/0103521 A1 | 3/2022 | Vaidya et al. |
| 2022/0103598 A1 | 3/2022 | Vaidya et al. |
| 2022/0191126 A1 | 6/2022 | Dubey et al. |
| 2022/0255896 A1 | 8/2022 | Jain et al. |

FOREIGN PATENT DOCUMENTS

| | | |
|---|---|---|
| CN | 102986172 A | 3/2013 |
| CN | 103650433 A | 3/2014 |
| CN | 103890751 A | 6/2014 |
| CN | 110061899 A | 7/2019 |
| EP | 1154601 A1 | 11/2001 |
| EP | 1290856 A2 | 3/2003 |
| EP | 1635506 A1 | 3/2006 |
| EP | 1868318 A1 | 12/2007 |
| EP | 3016331 A1 | 5/2016 |
| EP | 3314831 A1 | 5/2018 |
| EP | 3485610 A1 | 5/2019 |
| WO | 2010028364 A1 | 3/2010 |
| WO | 2011140028 A1 | 11/2011 |
| WO | 2012113444 A1 | 8/2012 |
| WO | 2013026049 A1 | 2/2013 |
| WO | 2013152716 A1 | 10/2013 |
| WO | 2015054671 A2 | 4/2015 |
| WO | 2017003881 A1 | 1/2017 |
| WO | 2018044341 A1 | 3/2018 |
| WO | 2021206785 A1 | 10/2021 |
| WO | 2021206786 A1 | 10/2021 |
| WO | 2021206790 A1 | 10/2021 |
| WO | 2022066269 A1 | 3/2022 |

OTHER PUBLICATIONS

Non-Published Commonly Owned U.S. Appl. No. 18/243,435 (G551. C1), filed Sep. 7, 2023, 135 pages, VMware, Inc.

Author Unknown, "What is a Data Center?," Cyberpedia, Month Unknown 2022, 5 pages, Palo Alto Networks, retrieved from https://www.paloaltonetworks.com/cyberpedia/what-is-a-data-center.

Author Unknown, "Apache Cassandra™ 1.2 Documentation," Jan. 13, 2013, 201 pages, DataStax.

Author Unknown, "OpenFlow Switch Specification, Version 1.1.0 Implemented (Wire Protocol 0x02)," Feb. 28, 2011, 56 pages, Open Networking Foundation.

Berde, Pankaj, et al., "ONOS Open Network Operating System An Open-Source Distributed SDN OS," Dec. 19, 2013, 34 pages.

Giannakou, Anna, et al., "Al-Safe: A Secure Self-Adaptable Application-Level Firewall for IaaS Clouds," 2016 IEEE 8th International Conference on Cloud Computing Technology and Science, Dec. 12-15, 2016, 8 pages, IEEE, Luxembourg City, LU.

Guo, Yingya, et al., "Traffic Engineering in SDN/OSPF Hybrid Network," The 22nd IEEE International Conference on Network Protocols (ICNP 2014), Oct. 21-24, 2014, 6 pages, IEEE, The Research Triangle, North Carolina, USA.

Hanna, Jeremy, "How ZooKeeper Handles Failure Scenarios," http://.apache.org/hadoop/Zookeeper/FailureScenarios. Dec. 9, 2010, 1 page.

Heller, Brandon, et al., "The Controller Placement Problem," Hot Topics in Software Defined Networks, Aug. 13, 2012, 6 pages, Helsinki, Finland.

Jin, Xin, et al., "Dynamic Scheduling of Network Updates," SIGCOMM'14, Aug. 17-22, 2014, 12 pages, ACM, Chicago, IL, USA.

Kohila, N., et al., "Data Security in Local Network Using Distributed Firewall," International Journal of Scientific Research in Computer Science Applications and Management Studies, Nov. 2014, 8 pages, vol. 3, Issue 6, jsrcams.com.

Krishnaswamy, Umesh, et al., "ONOS Open Network Operating System—An Experimental Open-Source Distributed SDN OS," Apr. 16, 2013, 24 pages.

Lebresne, Sylvain, "[Release] Apache Cassandra 1.2 released," Jan. 2, 2013, 1 page.

Loshin, Peter, et al., "What is a data center?," Special Report: Everything You Need to Know About the Log4j Vulnerability, Oct. 2021, 13 pages, retrieved from https://searchdatacenter.techtarget.com/definition/data-center.

Mahalingham, Mallik, et al., "VXLAN: A Framework for Overlaying Virtualized Layer 2 Networks over Layer 3 Networks," draft-mahalingham-dutt-dcops-vxlan-00.txt Internet Draft, Aug. 26, 2011, 20 pages, Internet Engineering Task Force.

Mahalingham, Mallik, et al., "VXLAN: A Framework for Overlaying Virtualized Layer 2 Networks over Layer 3 Networks," draft-mahalingham-dutt-dcops-vxlan-02.txt Internet Draft, Aug. 22, 2012, 20 pages, Internet Engineering Task Force.

Non-Published Commonly Owned Related U.S. Appl. No. 17/869,640 with similar specification, filed Jul. 20, 2022, 37 pages, VMware, Inc.

(56) References Cited

OTHER PUBLICATIONS

PCT International Search Report and Written Opinion of Commonly Owned International Patent Application PCT/US2021/015967 (G543.01.WO), mailed May 18, 2021, 13 pages, International Searching Authority (EP).

PCT International Search Report and Written Opinion of Commonly Owned International Patent Application PCT/US2021/015968 (G551.WO), mailed Apr. 23, 2021, 14 pages, International Searching Authority (EP).

PCT International Search Report and Written Opinion of Commonly Owned International Patent Application PCT/US2021/016118 (G548.01.WO), mailed Apr. 15, 2021, 11 pages, International Searching Authority (EP).

Schuba, Christoph, et al., "Integrated Network Service Processing Using Programmable Network Devices," SMLI TR-2005-138, May 2005, 30 pages, Sun Microsystems, Inc.

Surantha, Nico, et al., "Secure Kubernetes Networking Design Based on Zero Trust Model: A Case Study of Financial Service Enterprise in Indonesia," Innovative Mobile and Internet Services in Ubiquitous Computing, Jan. 2020, 14 pages, Springer Nature, Switzerland.

Wack, John, et al., "Guidelines on Firewalls and Firewall Policy," Recommendations of the National Institute of Standards and Technology, Special Publication 800-41, Jan. 2002, 75 pages, NIST, Gaithersburg, MD, USA.

\* cited by examiner

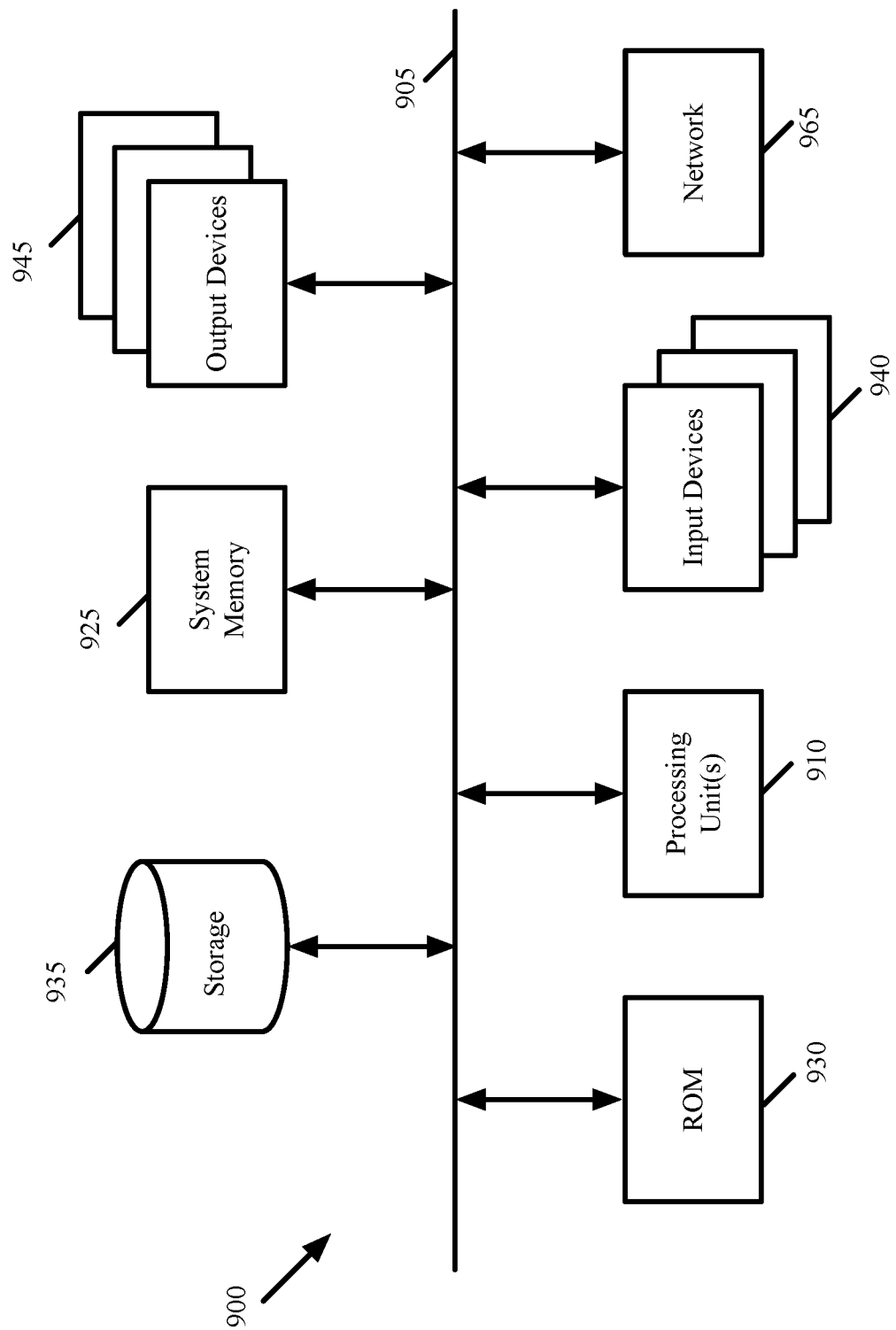

SHARING NETWORK MANAGER BETWEEN MULTIPLE TENANTS

BACKGROUND

The use of containers has changed the way applications are packaged and deployed, with monolithic applications being replaced by microservice-based applications. Here, the application is broken down into multiple, loosely coupled services running in containers, with each service implementing a specific, well-defined part of the application. However, the use of containers also introduces new challenges, in that the fleet of containers need to be managed and all these services and containers need to communicate with each other.

Management of the containers is addressed by container orchestration systems, such as Docker Swarm®, Apache Mesos®, or Kubernetes®, the latter of which has become a de-facto choice for container orchestration. Kubernetes clusters can be run in an on-premises datacenter or in any public cloud (e.g., as a managed service or by bringing up your own cluster on compute instances). In certain cases, an application could be offered by an application provider as a multi-tenant application. In such a scenario, the application provider needs to ensure fairness in distribution of resources to the different tenants.

BRIEF SUMMARY

Some embodiments provide a multi-tenant network policy manager implemented in a container cluster (e.g., a Kubernetes cluster). The network policy manager manages the logical networks for multiple tenants, each of which may have a logical network that is implemented across a respective set of one or more datacenters. The network policy manager cluster is responsible for receiving logical network configuration policy from administrators for the tenants, storing the logical network configuration, and distributing this configuration to the different tenant datacenters so that the logical networks can be correctly implemented across the tenant datacenters.

Within the container cluster, different functions of the network policy manager are implemented as different services (e.g., micro-services) on their own containers (e.g., on separate Kubernetes Pods). In some embodiments, the cluster includes multiple nodes, with the various services assigned to different nodes. In some embodiments, the services include both (i) shared services that are shared by all of the tenants and (ii) per-tenant services that are instantiated on a per-tenant basis (i.e., each container implementing the service is dedicated to a single tenant).

The network policy manager of some embodiments includes (i) application programming interface (API) processing services, (ii) a database service or services, (iii) queue management services, (iv) span determination services, and (v) channel management services. In some embodiments, the API processing services and the database service are shared between the various tenants, while the queue management services, span determination services, and channel management services are implemented on a per-tenant basis.

The API processing services receive configuration requests from tenants (e.g., specifying modifications to the tenant's logical network). In some embodiments, the ingress path for the container cluster is handled by a gateway that performs load balancing across the API processing services. That is, each configuration request is distributed by the gateway to one of the API processing services in the container cluster according to a load balancing algorithm. Each of these API processing services can receive configuration requests from multiple different tenants, as the API processing services of some embodiments are not instantiated on a per-tenant basis. In some embodiments, the gateway/load balancer also ensures that a single tenant cannot overload the system and prevent other tenants from being able to access the API processing services.

When a configuration request is received by one of the API processing services, the service parses the request to identify (i) the tenant making the request and (ii) the logical network modification requested. The request may specify to add, remove, or change a logical network element (e.g., a logical forwarding element, logical port, policy rule, etc.) in some embodiments. The API processing service then posts the logical network configuration change to a configuration queue for the identified tenant as well as to the logical network configuration stored for the tenant in the shared database.

The shared database, in some embodiments, is managed by one or more database services in the cluster. In some embodiments, the database is a distributed database (e.g., distributed across nodes in the cluster or stored outside of the container cluster) that stores the logical network configuration for each tenant. The database may be organized so as to store separate sets of tables for each tenant, or in any other way, so long as the tenant logical network configurations are accessible. In some embodiments, the logical network configuration data in the database tables for a particular tenant is expressed as a hierarchical tree of tenant intent.

As mentioned, the other services that make up the multi-tenant policy manager are separated per tenant in some embodiments, rather than shared. These services include the queue management services, span determination services, and channel management services. In some embodiments, a particular enterprise may have more than one separate logical network spanning different sets of (potentially overlapping) datacenters, which are treated as different tenants by the policy manager in some embodiments (and thus have separate corresponding sets of services).

The queue management service for a tenant stores the logical network configuration changes in a persistent configuration queue for the tenant. In some embodiments, this queue is created for the tenant logical network when the tenant is first defined within the policy manager.

The span determination service for a given tenant determines, for each logical network configuration change, which of the datacenters spanned by the tenant logical network needs to receive the update. In some embodiments, certain logical network elements only span a subset of the datacenters spanned by the logical network (e.g., logical switches or routers defined only within a specific datacenter, policy rules defined only for a subset of datacenters, etc.). The span determination service is responsible for making this determination for each update and providing one or more copies of the update to its corresponding channel management service (for the same tenant). In some embodiments, the span determination service also identifies for each item of logical network configuration stored in the database, which tenant datacenters require that configuration item.

The span determination services, in some embodiments, can either be on-demand or dedicated services. If a tenant has specified (e.g., via its subscription to the policy manager) for a dedicated span determination service, then this service will be instantiated either at the same time as the corresponding tenant queue or when a first logical network configuration change is added to that queue and will not be removed even when inactive. On the other hand, if a tenant specifies for on-demand span determination service, then this service is instantiated when the first logical network configuration change is added to the corresponding tenant queue but can be removed (and its resources recovered for use in the cluster) after a predetermined period of inactivity.

The channel management service for a particular tenant, in some embodiments, maintains dedicated channels (e.g., asynchronous channels) with each of the datacenters spanned by the tenant's logical network. Specifically, in some embodiments, the channel management service maintains channels with local network managers at each of these datacenters. In some embodiments, the channel management service includes queues for each of the tenant datacenters and logical network configuration changes are stored to each of the queues corresponding to the datacenters that require the changes. In addition, in some such embodiments, the channel management service guarantees various connection parameters required for dissemination of data.

By separating the queue management services, span determination services, and channel management services on a per-tenant basis, this ensures that a single tenant making large-scale logical network configuration changes does not overload the system to the detriment of the other tenants. Each per-tenant service has its own allocated resources (which may be dependent on the tenant's subscription with the policy manager) and thus can continue processing any logical network configuration changes for its respective tenants even if another tenant's services are overloaded. In addition, the number of services can be scaled as additional tenants are added to the policy manager.

In some cases, a datacenter spanned by one of the tenant logical networks will require a complete synchronization of the logical network for that tenant (i.e., at least the portion of the logical network that spans to that datacenter). This can be a fairly resource-intensive process, as the entire logical network configuration relating to that particular datacenter needs to be streamed from the database to the local network manager for that datacenter. In some embodiments, rather than burdening all of the existing services that handle the provision of updates for that tenant, the policy manager instantiates a separate on-demand configuration streaming service to handle the synchronization process. In different embodiments, this on-demand service may be instantiated within the container cluster or in a different container cluster (so as to avoid overloading resources of the primary container cluster housing the network policy manager).

The full synchronization of the configuration can be required for various reasons. For instance, if connectivity is lost between a tenant's channel management service and the local network manager for a particular datacenter, upon restoration of that connectivity the channel management service will notify a management service (e.g., a shared service) that executes in the container cluster. This management service is responsible for instantiating the on-demand configuration streaming service in some embodiments. In other cases, the synchronization might be required due to the receipt of an API command (i.e., via the shared API policy processing services) to synchronize the configuration for a particular datacenter or when a new datacenter is added to the span of a tenant logical network (as a certain portion of the tenant logical network may automatically span to this new datacenter).

In order to stream the requisite configuration data to the local network manager at the particular datacenter, the instantiated on-demand configuration streaming service reads the data from the shared database and provides the data (as a stream of updates) to the channel management service for the tenant (identified for being sent to the particular datacenter so that it is enqueued correctly by the channel management service). In some embodiments, each item of network configuration data has a span that is marked within the database and this span is used by the on-demand streaming configuration service to retrieve the correct configuration data. Once the configuration data has been fully streamed to the particular datacenter, the management service stops and removes the on-demand configuration streaming service in order to free up the resources.

In addition, the network policy manager of some embodiments limits the number of concurrently instantiated configuration streaming services (therefore limiting the number of datacenters that can be synchronized at the same time) in order to limit the strain on the shared database (e.g., to 5, 10, 20, etc. concurrent synchronizations). Some embodiments also limit the number of concurrent synchronizations for a particular tenant to a smaller number or otherwise ensure that this maximum number of concurrently instantiated configuration streaming services is spread fairly among all of the tenants (e.g., based on tenant subscriptions).

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and the Drawings is needed. Moreover, the claimed subject matters are not to be limited by the illustrative details in the Summary, Detailed Description, and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

FIG. 9 conceptually illustrates an electronic system with which some embodiments of the invention are implemented.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a multi-tenant network policy manager implemented in a container cluster (e.g., a Kubernetes cluster). The network policy manager manages the logical networks for multiple tenants, each of which may have a logical network that is implemented across a respective set of one or more datacenters. The network policy manager cluster is responsible for receiving logical network configuration policy from administrators for the tenants, storing the logical network configuration, and distributing this configuration to the different tenant datacenters so that the logical networks can be correctly implemented across the tenant datacenters.

Figure 1:
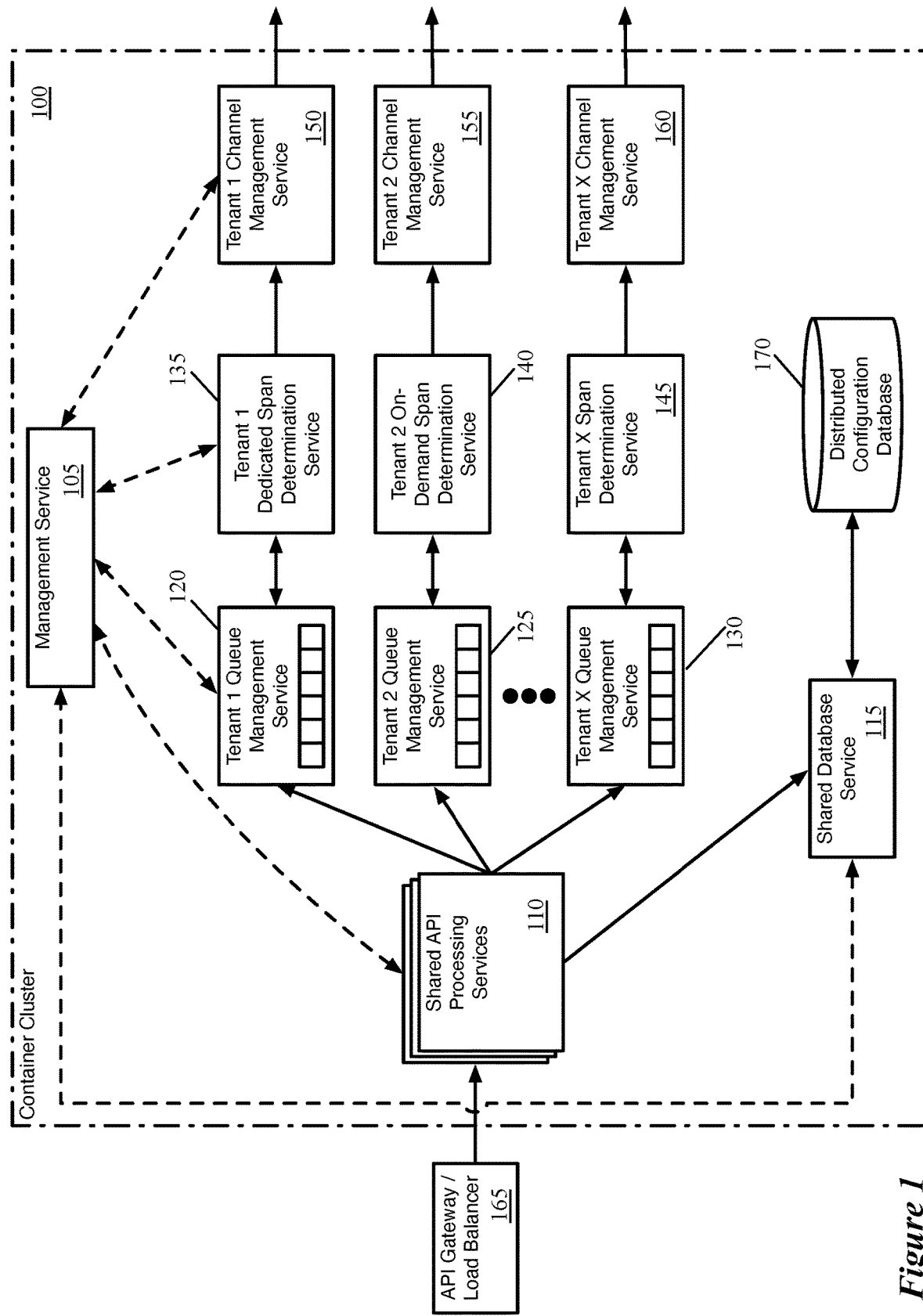
FIG. 1 conceptually illustrates a network policy manager of some embodiments implemented in a container cluster.

FIG. 1 conceptually illustrates such a network policy manager of some embodiments implemented in a container cluster 100. The container cluster 100, in different embodiments, may be implemented in a public cloud datacenter or a private datacenter (e.g., a private datacenter of the enterprise providing the network policy manager to various tenants). Within the container cluster, different functions of the network policy manager are implemented as different services (e.g., micro-services) on their own containers (e.g., on separate Kubernetes Pods). In some embodiments, the cluster includes multiple nodes, with the various services assigned to different nodes. It should be noted that FIG. 1 shows the logical architecture of the network policy manager within the container cluster 100. In some embodiments, the container cluster is a Kubernetes cluster that includes one or more nodes (e.g., virtual machines or physical host servers), each of which hosts multiple Pods, with each of the illustrated services executing within its own Pod. In addition, such a Kubernetes cluster includes various Kubernetes control elements (e.g., a Kube-API server, etc.) for configuring the cluster and each of the nodes executes various Kubernetes entities (e.g., a kube-proxy, container network interface, etc.).

The network policy manager, in some embodiments, is responsible for acting as a global network manager for multiple tenant logical networks. Each tenant logical network spans one or more physical sites (e.g., datacenters), and a separate local network manager operates at each of these physical sites to communicate with the network policy manager. It should be noted that a single tenant may administer multiple separate logical networks, but for the purposes of this description these are treated as separate tenants (e.g., in some embodiments each logical network has its own subscription with the network policy manager provider that specifies its own separate requirements and is thus treated separately by the network policy manager).

For a given tenant logical network, the network policy manager receives global logical network configuration data (e.g., from a network administrator through a user interface provided to the administrator). The primary purpose of the network policy manager (with respect to a particular tenant) is to receive and store the global configuration for a logical network that spans multiple datacenters, determine the span for each logical network element in the global logical network configuration (i.e., the datacenters at which the logical network is implemented) based on the specified configuration, and distribute the configuration data for each element to the local network managers at the datacenters that require the configuration data for that element. The operation of a global network manager for a single tenant logical network is described in greater detail in U.S. Pat. Nos. 11,381,456 and 11,088,919, both of which are incorporated herein by reference.

As shown in FIG. 1, the network policy manager of some embodiments includes a management service 105, shared application programming interface (API) processing services 110, a shared database service or services 115, per-tenant queue management services 120-130, per-tenant span determination services 135-145, and per-tenant channel management services 150-160. In some embodiments, the services include both (i) shared services that are shared by all of the tenants and (ii) per-tenant services that are instantiated on a per-tenant basis (i.e., each container implementing the service is dedicated to a single tenant). Specifically, in this example, the API processing services 110 and the database service 115 are shared between the various tenants, while the queue management services 120-130, span determination services 135-145, and channel management services 150-160 are implemented on a per-tenant basis.

The management service 105, in some embodiments, handles the management of the other services in the cluster 100. For instance, the management service 105 is responsible for instantiating and configuring additional API processing services 110 as needed, as well as starting up new sets of per-tenant queue management services, span determination services, and channel management services as new tenant logical networks are defined. The management service 105 is also responsible for stopping these services as needed (e.g., removing a set of per-tenant services when its corresponding tenant logical network is deleted). It should be noted that although the management service 105 is only shown communicating with the per-tenant services 120, 135, and 150 of tenant 1 (via the dashed lines), it actually communicates similarly with all of the other per-tenant services as well.

The API processing services 110 receive configuration requests from tenants (e.g., specifying modifications to the tenant's logical network). In some embodiments, the ingress path for the container cluster 100 is handled by a gateway 165 that performs load balancing across the API processing services 110. That is, each configuration request is distributed by the gateway (which may be a single gateway or a gateway cluster) to one of the API processing services 110 in the container cluster 100 according to a load balancing algorithm. The gateway 165, in some embodiments, executes within the same datacenter as the container cluster 100 (e.g., as a gateway managed at least partly by the cloud provider that owns the public cloud in which the container cluster 100 is implemented). Configuration requests are received at the gateway 165 from tenants via a network (e.g., the public Internet, a virtual private network, etc.). In some embodiments, the tenant administrators use a network management client (e.g., provided by the network policy manager provider) that enables easy configuration of logical networks.

As mentioned, the API processing services 110 are shared between tenants (i.e., are not instantiated on a per-tenant basis) and thus each of these API processing services 110 can receive configuration requests from multiple different tenants. In some embodiments, the gateway/load balancer 165 also ensures that a single tenant cannot overload the system and prevent other tenants from being able to access the API processing services 110. For instance, the gateway 165 can be configured to detect when a single source is sending a large number of configuration requests and either throttle these requests or send all of them to the same API processing service 110 so that they back up at that service while the other services are able to process configuration requests from other tenants.

When a configuration request is received by one of the API processing services 110, the service 110 parses the request to identify (i) the tenant making the request and (ii) the logical network modification requested. The request may specify to add, remove, or change a logical network element (e.g., a logical forwarding element, logical port, policy rule, etc.) in some embodiments. The API processing service 110 then posts the logical network configuration change to a configuration queue for the identified tenant as well as to the logical network configuration stored for the tenant in a shared database 170.

The shared database 170, in some embodiments, is managed by one or more shared database services 115. In some embodiments, the database 170 is a distributed database (e.g., Amazon DynamoDB® or a similar distributed database) that stores the logical network configuration for each tenant. In different embodiments, the database 170 may be distributed across nodes in the container cluster 100 or stored outside of the cluster (but accessed by the database service 115). The database 170 may be organized so as to store separate sets of tables for each tenant, or in any other way, so long as the tenant logical network configurations are accessible. In some embodiments, the logical network configuration data in the database tables for a particular tenant is expressed as a hierarchical tree of tenant intent. The hierarchical policy tree used to store a logical network configuration in some embodiments is described in U.S. Pat. Nos. 11,381,456 and 11,088,919, both of which are incorporated by reference above.

As mentioned, the other services 120-160 that make up the multi-tenant policy manager are separated per tenant in some embodiments, rather than shared between tenants. These services include the queue management services 120-130, span determination services 135-145, and channel management services 150-160. As mentioned, a particular enterprise may have more than one separate logical network spanning different sets of (potentially overlapping) datacenters, which are treated as different tenants by the policy manager in some embodiments (and thus have separate corresponding sets of services).

The queue management service 120-130 for a given tenant stores the logical network configuration changes requested for that tenant (as parsed by the API processing services 110) in a persistent configuration queue for the tenant. Because the API processing services 110 are shared, multiple different API processing services 110 may post configuration requests to the same queue. In some embodiments, the queue for a particular tenant logical network is created (and the queue management service instantiated to manage access to that queue) when the tenant logical network is initially defined within the policy manager (even if no configuration has yet been received). It should be noted that, in some embodiments, one or more shared queue management services are used in the network policy manager (instead of per-tenant services) to manage per-tenant configuration queues.

The span determination services 135-145 determine, for each logical network configuration change in its tenant's corresponding queue, which of the datacenters spanned by the tenant logical network needs to receive the update. In some embodiments, certain logical network elements only span a subset of the datacenters spanned by the logical network (e.g., logical switches or routers defined only within a specific datacenter, policy rules defined only for a subset of datacenters, etc.). The span determination service 135-145 is responsible for making this determination for each update and providing the update to its corresponding channel management service 150-160 (i.e., the channel management service for the same tenant). In some embodiments, the span determination service 135-145 also identifies, for each item of logical network configuration stored in the shared database 170, which tenant datacenters require that configuration item so that this span information can be stored in the database 170. The span calculations of some embodiments are described in U.S. Pat. Nos. 11,381,456 and 11,088,919, both of which are incorporated by reference above.

In some embodiments the span determination services 135-145 can either be on-demand or dedicated services. In some embodiments, the network policy manager restricts the span determination services to one or the other. However, in other embodiments, as shown in this example, the tenant can specify (e.g., via their subscription to the network policy manager) whether their span determination service should be on-demand (e.g., a function as a service) or dedicated.

If a tenant specifies a dedicated span determination service (e.g., tenant 1 in the example shown in the figure), then this service 135 is instantiated (e.g., by the management service 105) either at the same time as the corresponding tenant queue or when a first logical network configuration change is added to that queue. Even if the queue has not received any configuration change requests over a period of time, the span management service 135 remains operational. On the other hand, if a tenant specifies on-demand span determination service (e.g., tenant 2 in the example), then this service 140 is instantiated (e.g., by the management service 105) when the first logical network configuration change is added to the corresponding tenant queue but can be removed (e.g., by the management service 105) and its resources recovered for use in the cluster after a period of inactivity lasting a predetermined time.

The channel management services 150-160 each maintain dedicated channels with each of the datacenters spanned by their respective tenant's logical network. Specifically, in some embodiments, the channel management service for each tenant maintains asynchronous channels with local network managers at each of the datacenters spanned by the tenant's logical network. In some embodiments, each channel management service 150-160 includes queues for each of the tenant datacenters. When the corresponding span determination service 135-145 identifies the datacenters spanned by a particular logical network configuration change, that change is stored to each of the queues corresponding to those identified datacenters. The channel management service 150-160 then manages the transmission of these configuration changes from the respective queues to the respective local network managers. In addition, in some such embodiments, the channel management service guarantees various connection parameters required for dissemination of this configuration data and receives notifications and/or certain configuration updates from the local network managers. The channel management service for a single tenant is also discussed in further detail in U.S. Pat. Nos. 11,381,456 and 11,088,919, both of which are incorporated by reference above.

By separating the queue management services, span determination services, and channel management services on a per-tenant basis, this ensures that a single tenant making large-scale logical network configuration changes does not overload the system to the detriment of the other tenants. Each per-tenant service has its own allocated resources (which may be dependent on the tenant's subscription with the policy manager) and thus can continue processing any logical network configuration changes for its respective tenants even if another tenant's services are overloaded. In addition, the number of services can be easily scaled as additional tenants are added to the policy manager.

Figure 2:
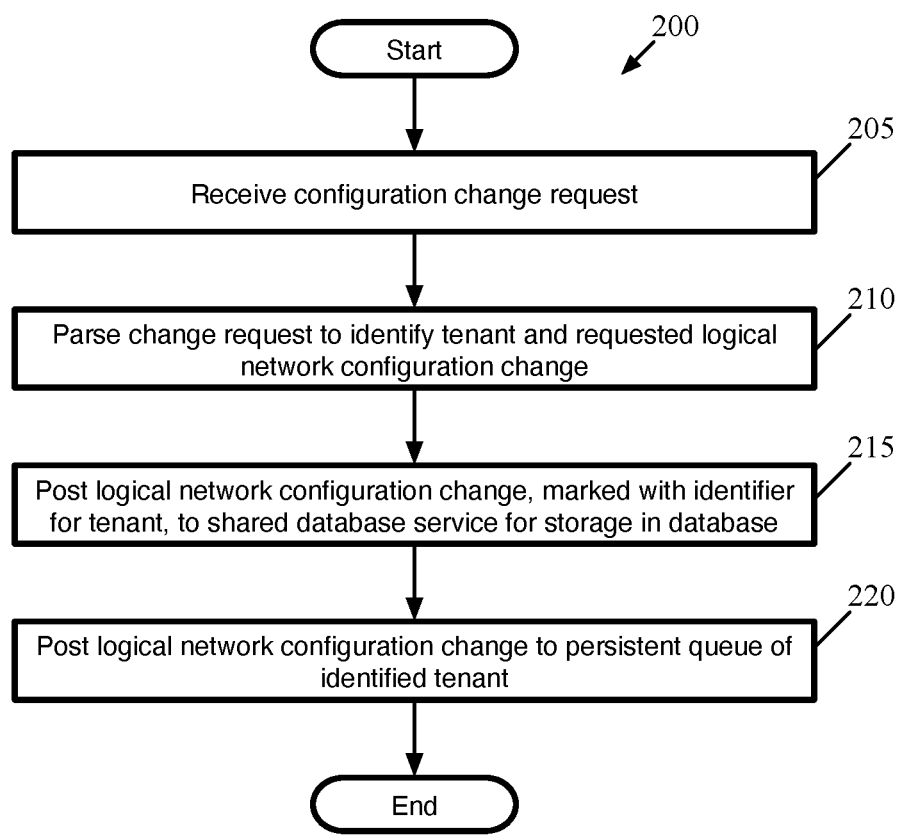
FIG. 2 conceptually illustrates a process of some embodiments for parsing a configuration change request and storing a configuration update at the network policy manager.

FIG. 2 conceptually illustrates a process 200 of some embodiments for parsing a configuration change request and storing a configuration update at the network policy manager. In some embodiments, the process 200 is performed by an API processing service of the network policy manager that is shared between the tenants of the policy manager. The process 200 will be described in part by reference to FIG. 3, which conceptually illustrates an example of the processing of a change request received by the network policy manager.

Figure 3:
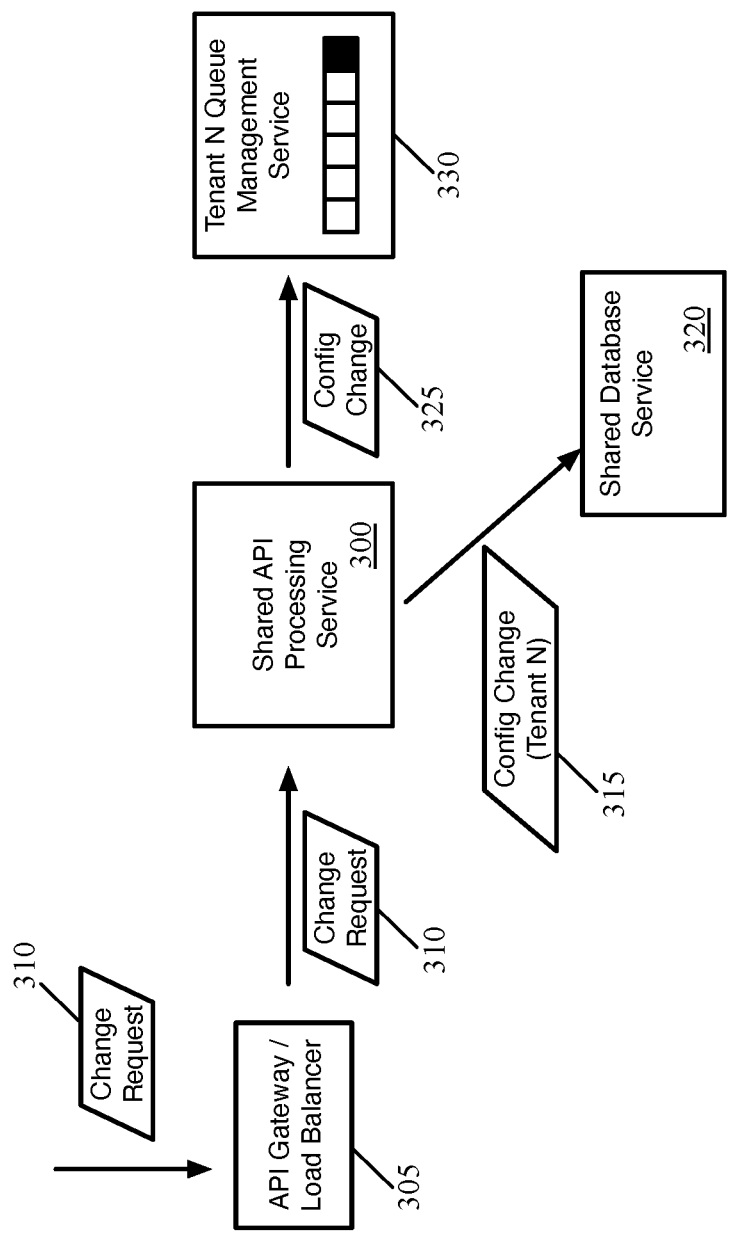
FIG. 3 conceptually illustrates an example of the processing of a change request received by the network policy manager.

As shown, the process 200 begins by receiving (at 205) a configuration change request. In some embodiments, this request is previously received by the ingress gateway/load balancer for the network policy manager, which selects one of the shared API processing services of the network policy manager to process the request. FIG. 3 shows an API gateway/load balancer 305 that initially receives a change request 310. The gateway 305 does not modify or process the change request 310, except to forward the data message(s) that carry the change request 310 to the shared API processing service 300 (i.e., the gateway 305 may modify L2-L4 headers of these data messages but does not perform processing on the payload of the data message relating to the logical network configuration). As such, the gateway 305 does not assign the change request 310 to a specific tenant. Instead, the gateway 305 selects the API processing service 300 (from among the multiple shared API processing services of the network policy manager) and forwards the change request 310 to the selected API processing service 300.

Next, the process 200 parses (at 210) the received change request to identify (i) the tenant and (ii) the requested logical network configuration change. The tenant, in some embodiments, is specified using a unique identifier in the change request. Other embodiments identify the tenant based on the source of the change request (e.g., a source network address) or other identifying information. Logical network configuration changes can add, delete, or modify any aspect of the logical network and/or certain aspects of how that logical network is implemented across the physical datacenters. The logical network aspects can include logical forwarding elements (e.g., logical switches and/or routers), logical services (e.g., distributed firewall, network address translation, etc.), and/or security policy (e.g., security groups and/or security rules), as well as changes to the span of these elements. In addition, the logical network configuration changes can specify groups of physical devices that are eligible at specific datacenters for implementation of the logical network at those datacenters.

After parsing the received change, the process 200 posts (at 215) the logical network configuration change, marked with an identifier of the tenant, to the shared database service for storage in the shared network policy manager database. As discussed, this database stores the logical network configuration for all of the tenants, either within the network policy manager container cluster or separate from the cluster. The shared database service is responsible, in some embodiments, for accessing (i.e., storing data to and retrieving data from) this database. FIG. 3 shows that the API processing service 300 provides configuration change data 315 to the shared database service 320. This configuration change data identifies the requested logical network configuration change as well as the tenant logical network to which it pertains, so that the database service 320 can differentiate the change from those of other tenants.

The process 200 also posts (at 220) the logical network configuration change to the persistent queue of the identified tenant, then ends. In some embodiments, because each tenant logical network has its own queue managed by a separate queue management service, this logical network configuration change need not specify the tenant. FIG. 3 shows that, in addition to providing the configuration change 315 (with the tenant identifier for tenant N) to the shared database service 320, the API processing service 300 separately provides a configuration change data item 325 to the queue management service 330 for tenant N. The configuration change data item 325 is added to the queue for tenant N that is managed by this service 330 so that the data item 325 can be distributed to the required datacenters.

Figure 4:
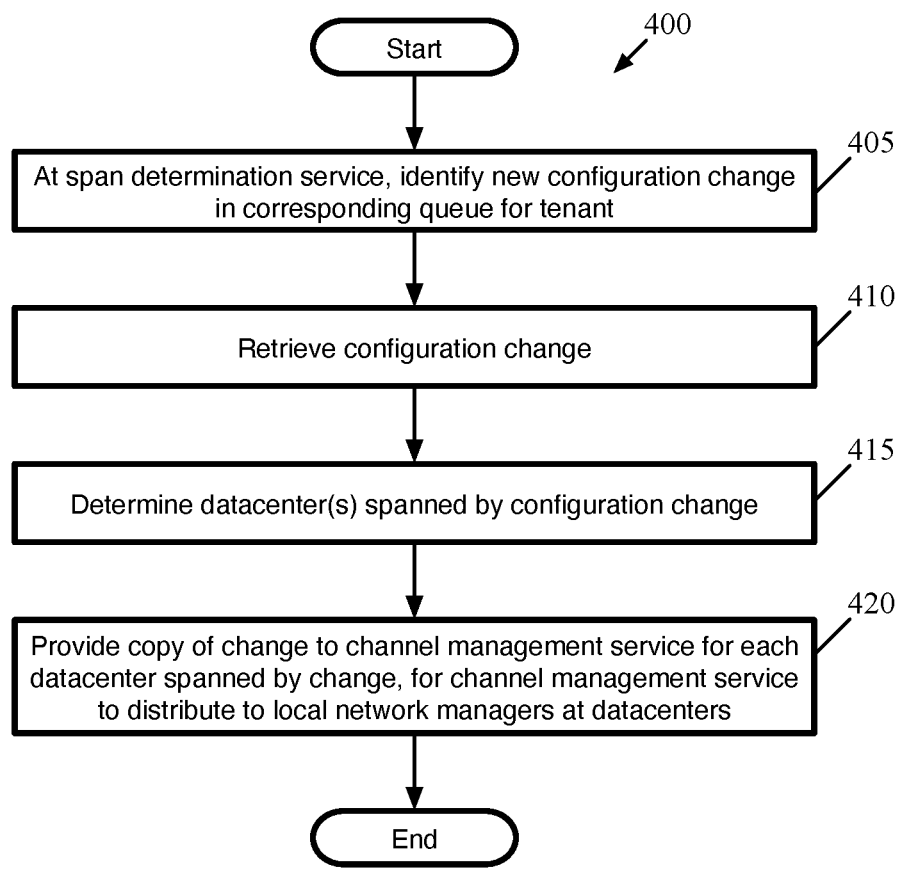
FIG. 4 conceptually illustrates a process of some embodiments for determining the span of a configuration change and enqueuing that configuration change to be sent to each datacenter spanned by the configuration change.

FIG. 4 conceptually illustrates a process 400 of some embodiments for determining the span of a configuration change and enqueuing that configuration change to be sent to each datacenter spanned by the configuration change. In some embodiments, the process 400 is performed by a span management service for a specific tenant within the multi-tenant network policy manager, such as that described above by reference to FIG. 1. The process 400 will be described in part by reference to FIG. 5, which conceptually illustrates an example of the processing of a configuration change by a span determination service.

As shown, the process 400 begins by, at the span determination service for a particular tenant, identifying (at 405) a new configuration change in the corresponding queue for the particular tenant. In some embodiments, the queue management service notifies the corresponding span determination service each time a new configuration change is added to the queue. In other embodiments, a notification is passed through the management service for the network policy manager, or the span determination service regularly polls the corresponding queue management service to determine whether any configuration changes are present in the queue.

The process 400 then retrieves (at 410) this configuration change from the queue. In some embodiments, when the span determination service has finished processing any previous configuration changes and has been notified that there is at least one configuration change pending in its queue, the span determination service sends a retrieval request to the corresponding queue management service to retrieve the next configuration change in the queue for that tenant. Figure shows that the queue management service 505 for tenant N provides a configuration change 510 to the span determination service 500 for tenant N (e.g., based on a retrieval request from the span determination service 500 for the next configuration change in the queue). The queue management service 505 also removes this configuration change 510 from the queue, such that the next request from the span determination service 500 will retrieve a different configuration change.

Next, the process 400 determines (at 415) the one or more datacenters spanned by the configuration change. In some embodiments, the span determination service interacts with the shared database to make this determination, as the span for a particular logical network element may depend on other logical network elements. In other embodiments, the span determination service stores a mapping of existing logical network elements to groups of datacenters and can use this mapping for changes that do not affect the span of a logical network element (e.g., connecting a logical switch to an existing logical router with a known span). However, for some changes (e.g., certain changes to policy), assessment of the hierarchical policy tree for the logical network is required and thus the span determination service needs to interact with the shared database service to retrieve at least a portion of the existing logical network configuration.

Finally, the process 400 provides a copy of the configuration change to the channel management service for the particular tenant for each datacenter spanned by the change, so that the channel management service can distribute the configuration change to the local network managers at these datacenters. The process 400 then ends. Different embodiments provide this configuration change differently when multiple datacenters require the change. In some embodiments, the span determination service provides a separate copy of the configuration change to the channel management service, with each copy marked for a specific datacenter. In other embodiments, the span determination provides a single copy of the change along with the list of datacenters to the channel management service, which replicates the change for each datacenter.

Figure 5:
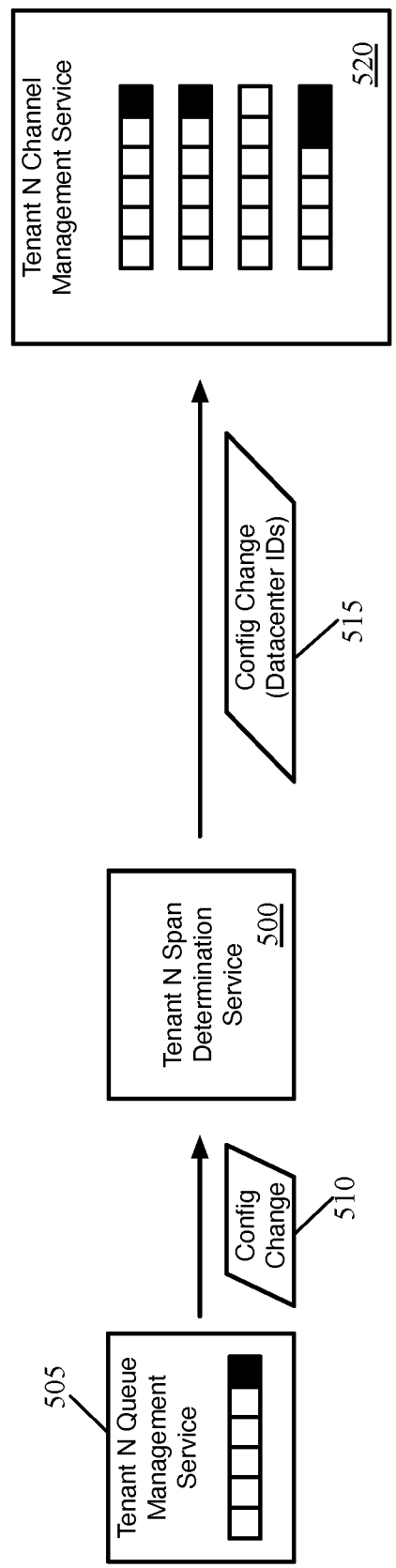
FIG. 5 conceptually illustrates an example of the processing of a configuration change by a span determination service.

FIG. 5 shows this latter option, as the span determination service 500 provides the configuration change 515 with a list of identified datacenters to the channel management service 520 for tenant N. This channel management service 520 stores separate queues for each of the four datacenters spanned by tenant N's logical network, and the configuration change is added to the queues for each of the datacenters identified by the span determination service 500. These changes will then be distributed by the channel management service 520 to the local network managers at the identified datacenters via the respective asynchronous communication channels.

In some cases, a datacenter spanned by one of the tenant logical networks will require a complete synchronization of the logical network for that tenant (i.e., at least the portion of the logical network that spans to that datacenter). This can be a fairly resource-intensive process, as the entire logical network configuration relating to that particular datacenter needs to be streamed from the database to the local network manager for that datacenter. In some embodiments, rather than burdening all of the existing services that handle the provision of updates for that tenant, the policy manager (e.g., the management service of the policy manager) instantiates a separate on-demand configuration streaming service to handle the synchronization process. In different embodiments, this on-demand service may be instantiated within the container cluster or in a different container cluster (so as to avoid overloading resources of the primary container cluster housing the network policy manager).

Figure 6:
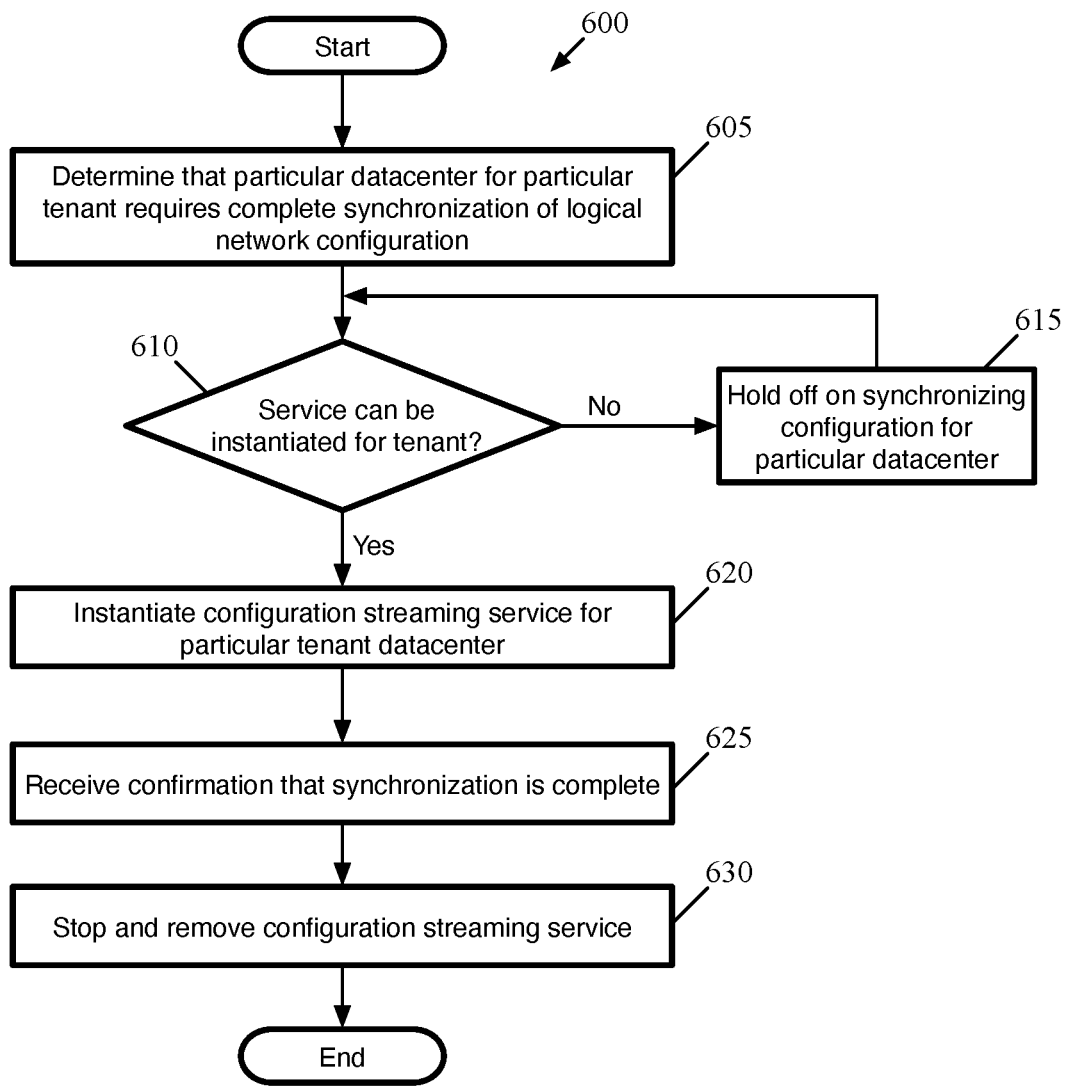
FIG. 6 conceptually illustrates a process of some embodiments for managing a complete synchronization of the logical network configuration for a particular datacenter.

FIG. 6 conceptually illustrates a process 600 of some embodiments for managing a complete synchronization of the logical network configuration for a particular datacenter. In some embodiments, the process 600 is performed by the management service of a network policy manager in response to a trigger that indicates the need for the complete configuration synchronization. The process 600 will be described in part by reference to FIGS. 7 and 8, which conceptually illustrate the instantiation, operation, and deletion of an on-demand configuration streaming service for the network policy manager. Specifically, FIG. 7 conceptually illustrates the instantiation and operation of an on-demand streaming service to perform a complete synchronization of a logical network configuration for a tenant datacenter over three stages 705-715, while FIG. 8 conceptually illustrates the deletion of that on-demand streaming service over two stages 805-810 once the synchronization is complete.

As shown, the process 600 begins by determining (at 605) that a particular datacenter for a particular tenant (i.e., spanned by the particular tenant's logical network) requires a complete synchronization of its logical network configuration from the global network policy manager. The logical network configuration synchronization may be required for various different reasons. For instance, if connectivity is lost between a tenant's channel management service and the local network manager for a particular datacenter, upon restoration of that connectivity, the channel management service notifies the management service that is responsible for instantiating the on-demand configuration streaming service in some embodiments. In other cases, the synchronization might be required due to the receipt of an API command (i.e., via the shared API policy processing services) to synchronize the configuration for a particular datacenter or when a new datacenter is added to the span of a tenant logical network (as a certain portion of the tenant logical network may automatically span to this new datacenter).

Figure 7:
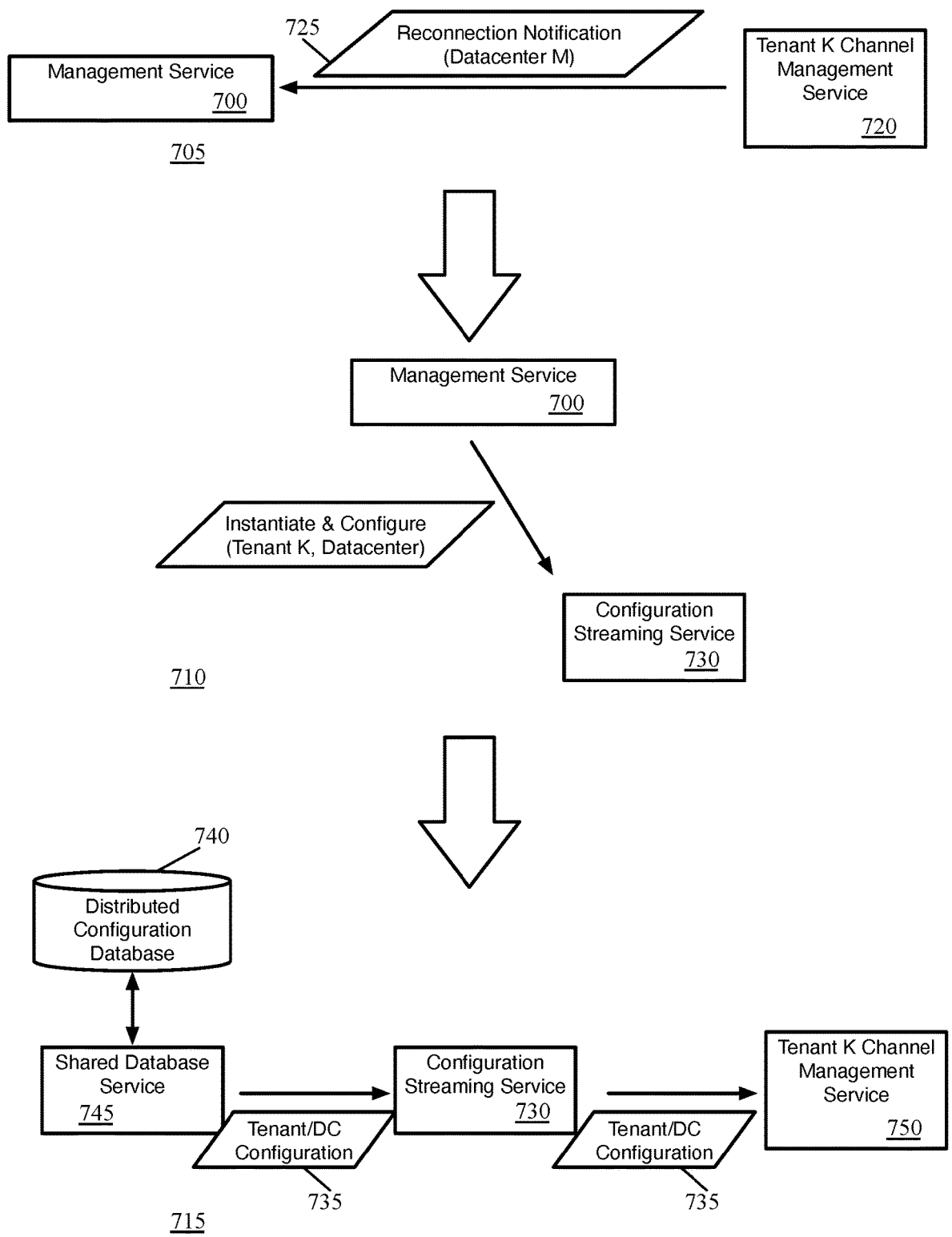
FIG. 7 conceptually illustrates the instantiation and operation of an on-demand streaming service to perform a complete synchronization of a logical network configuration for a tenant datacenter.

The first stage 705 of FIG. 7 shows that the channel management service 720 for tenant K sends a reconnection notification 725 to the shared manager service 700 of the network policy manager. This reconnection notification 725, in some embodiments, specifies the datacenter (e.g., using a unique datacenter identifier) for which the configuration synchronization is required. In addition, in some embodiments, the reconnection notification 725 also includes a unique tenant identifier.

Next, the process 600 determines (at 610) whether an on-demand service can currently be instantiated for the particular tenant. Some embodiments limit the number of concurrently instantiated on-demand configuration streaming services, therefore limiting the number of datacenters for which the configurations can be synchronized at the same time (e.g., to 10, 20, etc. concurrent synchronizations). This limits the strain on the shared database. While ideally the need for complete synchronizations would be rare, if the network policy manager were to lose external connectivity or a tenant simultaneously added a larger number of new datacenters to its logical network, overloads could occur.

In addition, to prevent a single tenant from locking other tenants out from synchronizing their own datacenters, some embodiments limit the number of concurrent synchronizations for a particular tenant to a smaller number or otherwise ensure that this maximum number of concurrently instantiated configuration streaming services is spread fairly among all of the tenants. For instance, a single tenant might be limited to a maximum that is a particular percentage (50%, 67%, etc.) of the total allowed number of concurrent synchronizations, with this per-tenant maximum variable based on the tenant subscription.

If the on-demand service cannot yet be instantiated for the particular tenant (either because the overall maximum or the per-tenant maximum has been reached), the process 600 holds off (at 615) on synchronizing the configuration for the particular datacenter. While the process 600 is shown as returning to 610 to continuously check whether the service can be instantiated for the tenant, it should be understood that this is a conceptual process, and the management service of the network policy manager may handle this situation differently in different embodiments. For instance, in some embodiments, the management service stores a queue of required synchronizations and is configured to instantiate an on-demand service for the next synchronization in the queue once one of the ongoing synchronizations is complete (although if the first synchronization in the queue is for a tenant at their per-tenant maximum and the completed synchronization is for a different tenant, then the first synchronization for an eligible tenant is begun instead).

Once the service can be instantiated for the particular tenant (i.e., either upon determining that the synchronization is needed or after completion of another datacenter synchronization), the process 600 instantiates (at 620) a configuration streaming service for the particular tenant datacenter. In some embodiments, the management service instantiates the configuration streaming service by communicating with a cluster control plane (e.g., a Kubernetes control plane) to instantiate a Pod for the on-demand streaming service. The management service also configures this new service by specifying the particular tenant and datacenter that requires the configuration synchronization. The second stage 710 of FIG. 7 shows that the management service 700, having received the reconnection notification 725, instantiates and configures an on-demand configuration streaming service 730, providing this service with configuration indicating the datacenter spanned by tenant K's logical network that requires synchronization.

Once instantiated, the on-demand configuration streaming service retrieves the required logical network configuration data from the configuration database. If the database is organized with the span information stored for each logical network element, then the configuration streaming service can retrieve only the configuration data that spans to the specified datacenter. On the other hand, if this span information is not stored in the database, then the configuration streaming service of some embodiments retrieves all of the logical network data for the tenant and performs its own span calculations to determine which data should be streamed to the particular datacenter.

The configuration streaming service, in some embodiments, provides this data to the channel management service for the particular tenant, and the channel management service streams the logical network configuration data via its connection with the local network manager at the particular datacenter. In some embodiments, the logical network configuration is streamed as a series of configuration changes (in addition to start and stop indicators) that are added to the channel management service queue for the particular datacenter and then transmitted by the channel management service. In other embodiments, the configuration streaming service uses the connection maintained by the channel management service but bypasses its datacenter queue.

The third stage 715 of FIG. 7 shows that the configuration streaming service 730 retrieves the logical network configuration 735 for the specified datacenter of tenant K from the distributed configuration database 740 via the shared database service 745 of the network policy manager. As mentioned, if the database 740 stores the span for each logical network element, then the database service 745 can provide the configuration streaming service 730 with only the logical network configuration required for the specified datacenter. The configuration streaming service 730 streams this logical network configuration 735 to the channel management service 750, which transmits the logical network configuration data to the local network manager for the specified datacenter via its communication channel with the local network manager. The synchronization process of some embodiments is described in greater detail in U.S. Pat. No. 11,088, 902, which is incorporated herein by reference.

As noted, once all of the logical network configuration data has been fully streamed to the particular datacenter, the on-demand configuration streaming service should be stopped (and deleted) in order to free up resources (potentially for additional synchronizations with other datacenters). Returning to FIG. 6, the process 600 receives (at 625) confirmation that the synchronization is complete. It should be understood that the process 600 is a conceptual process and that between operation 620 and 625 the management service of the network policy manager may perform various other operations relating to other configuration streaming services or other operations of the network policy manager.

Figure 8:
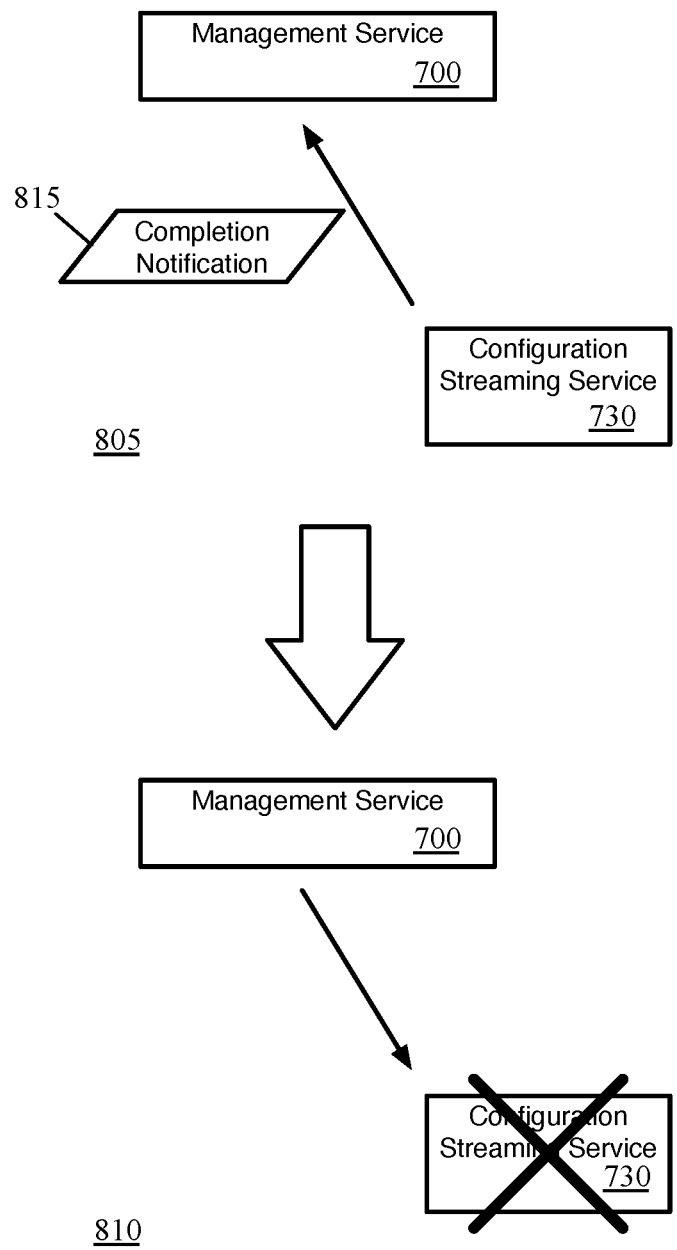
FIG. 8 conceptually illustrates the deletion of the on-demand streaming service once the synchronization is complete.

In some embodiments, the on-demand configuration streaming service sends this notification to the management service. The first stage 805 of FIG. 8 shows the configuration streaming service 730 sending such a notification 815 to the management service 700 to indicate that the logical network configuration for the particular datacenter has been sent to the logical network manager. The notification may be sent after the streaming service has provided all of the data to the channel management service or the channel management service has notified the configuration streaming service that all of the logical network configuration data is transmitted to the local network manager for the particular datacenter (either after the data is transmitted or after receiving a notification from the local network manager). In other embodiments, the channel management service notifies the management service once the transmission of all of the data is completed, either after transmitting the last data or after receiving an acknowledgement from the local network manager that all of the data has been received.

Upon receiving such a notification, the process 600 stops and removes (at 630) the configuration streaming service, then ends. In some embodiments, the management service stops the configuration streaming service by communicating with a cluster control plane (e.g., a Kubernetes control plane) to remove the Pod implementing the on-demand streaming service. In other embodiments, the management service stops and deletes the service (and its Pod) directly. The second stage 810 of FIG. 8 shows that the management service 700, upon receipt of the completion notification 815, stops and deletes the configuration streaming service 730, thereby freeing up the resources used by that service.

FIG. 9 conceptually illustrates an electronic system 900 with which some embodiments of the invention are implemented. The electronic system 900 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 900 includes a bus 905, processing unit(s) 910, a system memory 925, a read-only memory 930, a permanent storage device 935, input devices 940, and output devices 945.

The bus 905 collectively represents all system, peripheral, and chipset buses that communicatively connect the numerous internal devices of the electronic system 900. For instance, the bus 905 communicatively connects the processing unit(s) 910 with the read-only memory 930, the system memory 925, and the permanent storage device 935.

From these various memory units, the processing unit(s) 910 retrieve instructions to execute and data to process in order to execute the processes of the invention. The processing unit(s) may be a single processor or a multi-core processor in different embodiments.

The read-only-memory (ROM) 930 stores static data and instructions that are needed by the processing unit(s) 910 and other modules of the electronic system. The permanent storage device 935, on the other hand, is a read-and-write memory device. This device is a non-volatile memory unit that stores instructions and data even when the electronic system 900 is off. Some embodiments of the invention use a mass-storage device (such as a magnetic or optical disk and its corresponding disk drive) as the permanent storage device 935.

Other embodiments use a removable storage device (such as a floppy disk, flash drive, etc.) as the permanent storage device. Like the permanent storage device 935, the system memory 925 is a read-and-write memory device. However, unlike storage device 935, the system memory is a volatile read-and-write memory, such a random-access memory. The system memory stores some of the instructions and data that the processor needs at runtime. In some embodiments, the invention's processes are stored in the system memory 925, the permanent storage device 935, and/or the read-only memory 930. From these various memory units, the processing unit(s) 910 retrieve instructions to execute and data to process in order to execute the processes of some embodiments.

The bus 905 also connects to the input and output devices 940 and 945. The input devices enable the user to communicate information and select commands to the electronic system. The input devices 940 include alphanumeric keyboards and pointing devices (also called "cursor control devices"). The output devices 945 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 9, bus 905 also couples electronic system 900 to a network 965 through a network adapter (not shown). In this manner, the computer can be a part of a network of computers (such as a local area network ("LAN"), a wide area network ("WAN"), or an Intranet, or a network of networks, such as the Internet. Any or all components of electronic system 900 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIGS. 2, 4, and 6) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method comprising:
    at one of a plurality of shared API processing services in a container cluster that implements a network policy manager shared between a plurality of tenants, receiving a configuration request from a particular tenant to modify a logical network configuration for the particular tenant, wherein configuration requests from the plurality of tenants are balanced across the plurality of shared API processing services; and
    based on the received configuration request, posting a logical network configuration change to a configuration queue in the cluster, the configuration queue dedicated to the logical network of the particular tenant,
    wherein services are instantiated separately in the container cluster for each tenant to distribute configuration changes from the respective configuration queues for the tenants to datacenters that implement the tenant logical networks;
    wherein each respective configuration queue is managed by a respective dedicated queue service implemented on a respective Pod.

2. The method of claim 1, wherein at least a subset of the tenants have respective logical networks implemented across respective pluralities of datacenters.

3. The method of claim 2, wherein the services for distributing configuration changes comprise, for each tenant of a set of the tenants, (i) a span determination service that identifies, for each configuration change posted to the configuration queue for the tenant, which of the tenant datacenters require the configuration change and (ii) a channel management service that manages communication channels with the datacenters across which the tenant logical network is implemented and transmits the configuration changes to the datacenters requiring the configuration changes via the communication channels.

4. The method of claim 3, wherein for the particular tenant, the span determination service is instantiated on-demand when a configuration change is posted to the configuration queue for the particular tenant.

5. The method of claim 4, wherein when the span determination service for the particular tenant has been inactive for a predefined period of time because no configuration changes have been posted to the configuration queue for the particular tenant during the predefined period of time, the span determination service for the particular tenant is stopped and resources utilized by the span determination service are recovered for use by other services in the cluster.

6. The method of claim 3, wherein:
    the logical network of the particular tenant spans a particular plurality of datacenters; and
    the channel management service for the particular tenant manages a separate asynchronous channel for communicating with local network managers at each of the particular plurality of datacenters.

7. The method of claim 1, wherein a load balancer receives configuration requests from the plurality of tenants and balances the configuration requests across the plurality of shared API processing services.

8. The method of claim 1, wherein the container cluster comprises (i) the plurality of shared API processing services, (ii) a shared database service that stores the logical network configurations for the plurality of tenants, (iii) a respective configuration queue service for each respective tenant for managing the respective configuration queue for the tenant, and (iv) the respective services for distributing the configuration changes from the respective configuration queues for the respective tenants to the datacenters implementing the respective tenant logical networks.

9. The method of claim 1, wherein the container cluster is a Kubernetes cluster comprising one or more nodes.

10. The method of claim 9, wherein each shared API processing service executes on a separate Pod.

11. The method of claim 9, wherein the respective services for distributing configuration changes are each implemented on a respective set of one or more Pods.

12. A non-transitory machine-readable medium storing an API processing service for execution by at least one processing unit, wherein the API processing service is one of a plurality of shared API processing services in a container cluster that implements a network policy manager shared between a plurality of tenants, the API processing service comprising sets of instructions for:
    receiving a configuration request from a particular tenant to modify a logical network configuration for the particular tenant, wherein configuration requests from the plurality of tenants are balanced across the plurality of shared API processing services; and
    based on the received configuration request, posting a logical network configuration change to a configuration queue in the cluster, the configuration queue dedicated to the logical network of the particular tenant,
    wherein services are instantiated separately in the container cluster for each tenant to distribute configuration changes from the respective configuration queues for the tenants to datacenters that implement the tenant logical networks;
    wherein each respective configuration queue is managed by a respective dedicated queue service implemented on a respective Pod.

13. The non-transitory machine-readable medium of claim 12, wherein:
    at least a subset of the tenants have respective logical networks implemented across respective pluralities of datacenters; and
    the services for distributing configuration changes comprise, for each tenant of a set of the tenants, (i) a span determination service that identifies, for each configuration change posted to the configuration queue for the tenant, which of the tenant datacenters require the configuration change and (ii) a channel management service that manages communication channels with the datacenters across which the tenant logical network is implemented and transmits the configuration changes to the datacenters requiring the configuration changes via the communication channels.

14. The non-transitory machine-readable medium of claim 13, wherein:
   for the particular tenant, the span determination service is instantiated on-demand when a configuration change is posted to the configuration queue for the particular tenant; and
   when the span determination service for the particular tenant has been inactive for a predefined period of time because no configuration changes have been posted to the configuration queue for the particular tenant during the predefined period of time, the span determination service for the particular tenant is stopped and resources utilized by the span determination service are recovered for use by other services in the cluster.

15. The non-transitory machine-readable medium of claim 13, wherein:
   the logical network of the particular tenant spans a particular plurality of datacenters; and
   the channel management service for the particular tenant manages a separate asynchronous channel for communicating with local network managers at each of the particular plurality of datacenters.

16. The non-transitory machine-readable medium of claim 12, wherein a load balancer receives configuration requests from the plurality of tenants and balances the configuration requests across the plurality of shared API processing services.

17. The non-transitory machine-readable medium of claim 12, wherein the container cluster comprises (i) the plurality of shared API processing services, (ii) a shared database service that stores the logical network configurations for the plurality of tenants, (iii) a respective configuration queue service for each respective tenant for managing the respective configuration queue for the tenant, and (iv) the respective services for distributing the configuration changes from the respective configuration queues for the respective tenants to the datacenters implementing the respective tenant logical networks.

18. The non-transitory machine-readable medium of claim 12, wherein:
   the container cluster is a Kubernetes cluster comprising one or more nodes; and
   each shared API processing service executes on a separate Pod.

19. The non-transitory machine-readable medium of claim 12, wherein:
   the container cluster is a Kubernetes cluster comprising one or more nodes.

* * * * *